INVENTOR
David B. Wiese.
C. L. Freedman
ATTORNEY

Patented Sept. 16, 1952

2,610,988

UNITED STATES PATENT OFFICE 2,610,988

FREQUENCY COMPENSATED IRON-VANE INSTRUMENT

David B. Wiese, Highland, N. Y., assignor to Westinghouse Electric Corporation, East Pittsburgh, Pa., a corporation of Pennsylvania Application May 8, 1948, Serial No. 25,952

6 Claims. (Cl. 171—95)

This invention relates to electrical instruments and it has particular relation to electrical measuring instruments of the moving-iron type.

A moving-iron instrument includes a winding for producing a magnetic field. A plurality of magnetic elements usually formed of soft iron are disposed in the magnetic field produced by current flowing in the winding. When these magnetic elements are magnetized they develop attraction or repulsion forces therebetween. One of the magnetic elements is disposed for rotation with respect to the remainder of the magnetic elements under the influence of these forces. Among the problems presented in the design of a moving-iron instrument is the production of an instrument which will embody frequency-compensating features so that the readings, and particularly the up-scale readings, will not be affected by a change in the frequency of the alternating current to be measured.

A moving-iron instrument is provided with a winding effective, when energized, for producing a magnetic field. A substantially cylindrical fixed magnetic element or iron is disposed in this magnetic field and has an axial length which varies from a predetermined value at one end (which may be termed the down-scale end) to a smaller value at the opposite end (which may be termed the up-scale end). A moving magnetic element or iron is disposed adjacent the fixed magnetic iron for rotation substantially about the axis of the fixed magnetic iron. The magnetization of the fixed and moving magnetic irons by the magnetic field results in a repulsion force therebetween. Because of the tapered construction of the fixed magnetic iron, the repulsion force has a torque component tending to rotate the moving iron up-scale or towards the up-scale end of the fixed magnetic iron. In accordance with this invention, it is proposed to employ one or more short circuited turns or conductors associated with the fixed magnetic element or iron to reduce the over-all frequency error of the instrument.

It is, therefore, an object of the invention to provide an improved electrical instrument of the moving-iron type.

It is a further object of the invention to provide an improved electrical instrument of the moving iron type which is less affected by change in frequency of the alternating current to be measured, particularly when the moving magnetic element is in the vicinity of the up-scale end of the fixed magnetic element.

It is still a further object of the invention to provide an improved electrical instrument of the moving iron type having a conductive coating applied to one of the magnetic elements thereof.

It is still a further object of the invention to provide an improved electrical instrument of the moving iron type having a secondary or electromagnetic inductive circuit associated therewith.

Other objects of the invention will be apparent from the following description taken in conjunction with the accompanying drawing, in which.

Figure 1:
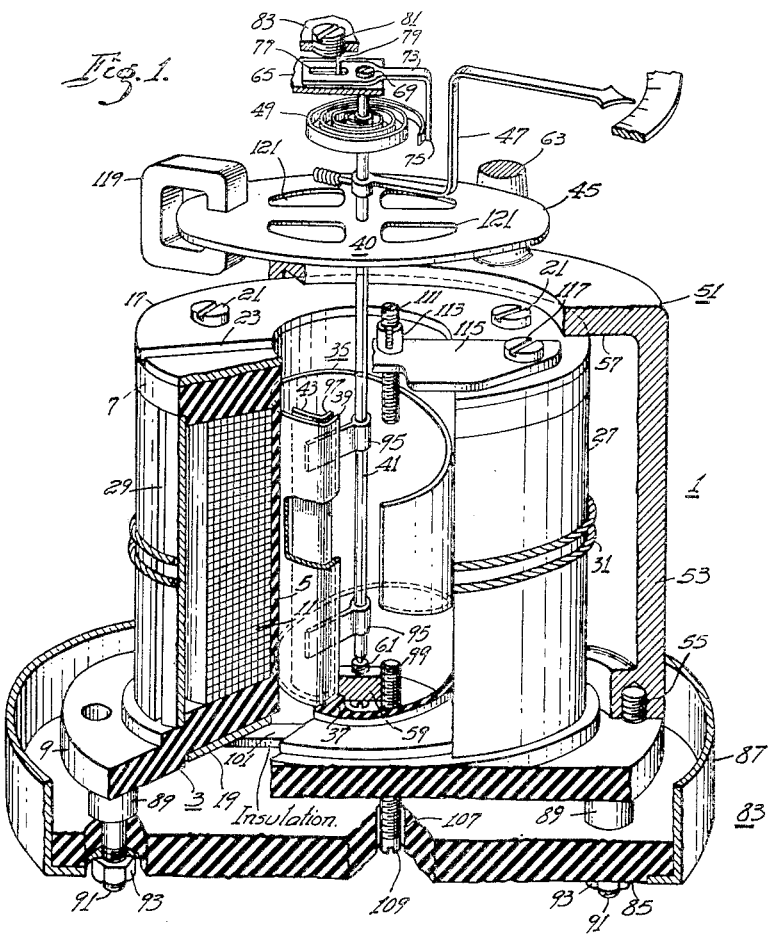
Figure 1 is a view in perspective with parts broken away of an electrical instrument embodying one form of the invention.

Referring to the drawing, Figure 1 shows a moving-iron instrument having a stator assembly 1 which includes a coil spool 3. The coil spool 3 is formed with a tubular portion 5 having flanges 7 and 9 at its ends. The tubular portion 5 and the flanges 7 and 9 conveniently may be molded as an integral unit from a suitable insulating material such as a phenolic resin. When energized, a primary circuit or winding 11 produces a magnetic field within the tubular portion 5. To assist in directing magnetic flux into the tubular portion 5, magnetic members 17 and 19 with non-circular openings therein, are suitably secured to the flanges 7 and 9 as by cement or machine screws 21. The magnetic members 17 and 19 may take the form of rings constructed of a magnetic material such as soft iron. Since the instrument may be employed for alternating-current measurements, the ring 17 is provided with a slot 23 for the purpose of restricting eddy-current flow therein. A similar or larger slot (not shown) may be provided in the ring 19 for the same purpose and for the additional purpose of permitting passage therethrough of terminal leads to the winding 11. A magnetic band 27 which surrounds the winding 11 may be formed of a suitable magnetic material such as soft iron. The ends of the band 27 may be spaced to provide an axial slot 29 to restrict flow of eddy-currents therein. The band 27 may be secured in position by a few turns of cord 31 secured therearound.

A fixed magnetic element 35 of substantially cylindrical shape is disposed in the tubular portion 5 and is securely cemented to the tubular portion. To facilitate proper location of the fixed magnetic element 35, the tubular portion may be provided with an integral abutment 37 against which one end (which may be termed the down-scale end) of the fixed magnetic element is placed. The fixed magnetic element 35 may be formed of suitable magnetic sheet material such as soft iron. By inspection of Fig. 1 it will be observed that the axial length of the fixed magnetic element or fixed iron 35 varies from a predetermined value adjacent the down-scale end thereof to a smaller length adjacent the remaining end which may be termed the up-scale end thereof. The down-scale end of the fixed iron 35 is bent inwardly to provide a lip or flange 39 having substantial surfaces which are substantially parallel to a plane containing the axis of the fixed iron 35.

The instrument has a rotor assembly 40 which includes a shaft 41, a moving magnetic element 43, a damping member or disk 45, a pointer 47, and a spiral control spring 49. The rotor assembly is supported by a frame 51 which includes a shell 53 secured to the flange 9 by suitable machine screws 55. The shell 53 has a flange 57 which overlies the ring or magnetic member 17 and which has an L-shaped bracket 59 projecting therefrom into the tubular portion 5. The bracket 59 (only a portion of which is shown) has a jewel or bearing screw 61 in threaded engagement therewith for receiving one end of the shaft 41. The flange 57 also has pillars 63 projecting therefrom about the disk or damping member 45. A bridge plate 65 is attached to these pillars by suitable means such as machine screws (not shown). The bridge plate 65 has in threaded engagement therewith, a jewel or bearing screw 69 for receiving an end of the shaft 41.

The bridge plate 65 also carries a lever 73 which is mounted for rotation about the axis of the shaft 41. This lever 73 has a lug 75 projecting therefrom to which the outer end of the spiral control spring 49 is secured by solder. In addition, the lever 73 has a slot 77 for receiving a pin 79 eccentrically secured to a zero adjusting button 81. The button 81 is rotatable with respect to a portion of a housing 83 which also includes a base member 85 and a shell 87. It will be understood that the housing surrounds the electrical instrument but is broken away in Fig. 1 for the purpose of exposing the instrument. Spacers 89 project from the flange 9 to engage the base member 85 and have studs 91 projecting through openings in the base member. Nuts 93 cooperate with the studs 91 to secure the instrument to the base member 85.

The moving magnetic element 43 is formed of a suitable material such as soft iron and is attached to the shaft 41 by means of suitable brackets 95. It will be observed that the moving magnetic element or iron 43 has an arcuate surface adjacent the interior surface of the fixed iron 35. When magnetic flux passes through the tubular portion 5, the fixed iron 35 and moving iron 43 are magnetized to develop a substantial repulsion force therebetween. Since the fixed magnetic element or iron 35 is tapered in an upscale direction, a component of the repulsion force is in a tangential direction with respect to the path of movement of the moving iron 43 and urges the moving iron in an up-scale direction to an up-scale position. Such motion of the moving iron is opposed by the bias exerted by the spiral control spring 49.

When the moving iron 43 is in the zero or down-scale position illustrated, the flange 39 extends across an edge of the moving iron 43. Consequently magnetic flux passing through the tubular portion 5 produces a repulsion force acting between the flange 39 and the associated edge of the moving iron 43. This repulsion force corresponds to an additional torque which urges the moving iron in an up-scale direction. To increase this additional torque, the moving iron 43 is provided with a lip or flange 97 which is adjacent the flange 39 when the moving iron 43 is in the position illustrated in Fig. 1. The provision of the flanges 39 and 97 materially increases the sensitivity of the instrument when the moving iron 43 is in the vicinity of the flange 39.

An additional magnetic element is also employed which conveniently may be in a form of a soft iron screw 111 which is positioned to act as an attraction iron. When the moving iron 43 is adjacent the up-scale end of the fixed iron 35, an attraction force is developed between the moving iron 43 and the attraction iron 111 which increases the resultant torque acting to urge the moving iron 43 toward its extreme up-scale position. The attraction iron 111 is mounted on a supporting strip 115 which may be formed of any suitable material, and is secured to the flange 7 by means of machine screws 117. If formed of electro-conductive material, the strip 115 may be insulated from the ring 17 to reduce eddy-current flow therethrough. If desired, however, the strip 115 may be formed of an insulating material such as a phenolic resin. The strip 115 has a bushing 113 extending therethrough which is threaded internally for receiving the attraction iron 111.

If desired, an additional attraction iron 99 may be similarly supported by a supporting strip 101 which is secured to the flange 9. The attraction iron 99 projects through an opening 107 in the base member 85, and has a slot 109 in the end thereof which is externally accessible. It has been found that a single attraction iron is sufficient in most cases. For this reason, it is frequently preferable to employ only the attraction iron 99, which is externally accessible.

The damping member 45 may take the form of an electro-conductive disk which is positioned for rotation between the poles of a permanent magnet 119 which is supported with respect to the frame 51. As well understood in the art, the permanent magnet 119 and the damping disk 45 cooperate to damp rotation of the rotor assembly. To lighten the damping disk and to permit inspection of the mechanism in the armature or tubular portion 5 therethrough, a plurality of openings 121 are provided in the damping disk.

In copending patent application Serial No. 515,263, filed December 22, 1943, in the name of Herbert T. Rights, entitled Electrical Measuring Instrument and assigned to the same assignee as this application (issued March 21, 1950, as United States Letters Patent No. 2,501,356), the foregoing moving-iron type of measuring instrument is more fully disclosed and described.

It is to be observed that in an iron vane type of instrument, the moving magnetic element and the pointer in moving from a zero or down-scale position to a full up-scale position may rotate through an angle in the order of 250° or 270°. If a change in frequency occurs in the alternating current flowing in the winding of an iron-vane type of instrument there is a tendency for a small error to be introduced in the instrument when the moving magnetic element is at the lower or down-scale positions. The error increases as the moving magnetic element moves up-scale, the error becoming very pronounced adjacent the full-scale position. In order to improve the over-all accuracy of the instrument, it is proposed to greatly decrease the error at the up-scale positions by means of a secondary or electromagnetic inductive circuit. Current is induced by mutual inductance in the secondary circuit when an alternating current is applied to the primary circuit or winding 11. As one means of reducing the over-all errors due to change in frequency, it is proposed to employ a fixed magnetic element with low electrical resistance surfaces.

To provide a fixed magnetic element with electrical conductive surfaces, satisfactory results have been obtained by employing a soft-iron fixed magnetic element 35, as herein described, and applying a copper plating 36 (as indicated in particular in Figs. 3 and 4) of approximately one-thousandth of an inch in thickness over the surfaces thereof. The plating 36 on the surfaces of the fixed magnetic element 35 should have a low electrical resistance and should afford a closed electrical circuit in a plane transverse to the magnetic field produced by the winding 11 when the winding is energized.

The effects of closed conductive loop or secondary circuit, which for convenience may be referred to herein as one form of short-circuited turn, may be more fully understood by referring to Fig. 1. The magnetic flux, produced by the winding 11, passes in a vertical direction through the moving magnetic element 43 and the fixed magnetic element 35. The flux tends to divide and flow through both elements. With the short-circuited turn surrounding the fixed magnetic element 35 in substantially a horizontal plane, a counterflux is produced by the short-circuited turn, which opposes the flow of the flux produced by the winding 11 through the fixed magnetic element 35; and particularly through the down-scale end thereof, since the vertical length of the fixed magnetic element 35 is longer at the down-scale end. The vertical length of the fixed magnetic element 35 decreases in the up-scale direction. Because of the short-circuited turn, a portion of the flux is diverted from fixed magnetic element 35 to the moving magnetic element 43.

This shielding effect or counterflux produced by the short-circuited turn not only reduces the amount of flux passing through the fixed magnetic element 35, and particularly through its down-scale portion, but also causes a phase shift of the flux in the fixed magnetic element 35, in relation to the flux in the moving magnetic element 43. With the flux in the two elements out of phase, there is less magnetic repulsion between them. The resultant magnetic repulsion force between the elements tends to produce a torque to urge the moving magnetic element 43 in the up-scale direction.

The diversion of the flux from one element to the other tends to cause an increase or decrease in torque depending upon which magnetic element has the stronger magnetic pole strength at the particular position of the moving magnetic element. When the moving magnetic element 43 is at a down-scale position, the moving magnetic element 43 is relatively weak magnetically.

Figure 2:
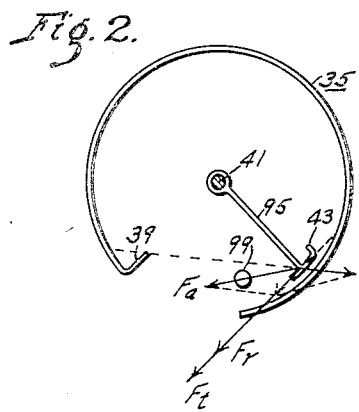
Fig. 2 is a schematic view of the relative positions of the magnetic elements of an electrical instrument and illustrates certain vector magnetic forces acting upon the moving magnetic element in an up-scale position.

To facilitate illustrating and describing the direction and magnitude of the vector magnetic forces likely to be present when the moving magnetic element 43 is in an up-scale position, Fig. 2 in the drawing shows schematically, the relative positions of the fixed magnetic element 35, the moving magnetic element 43 which is rotated in an up-scale direction in excess of 180°, and the attraction magnetic element 39.

The vector $F_r$ illustrates the assumed magnitude of the vector tangential component of the magnetic force acting between the adjacent portion of the fixed magnetic element 35 and the moving magnetic element 43, the magnetic force being one of repulsion and consequently the moving magnetic element 43 is urged in an up-scale direction.

As previously described, a magnetic attraction force exists between the attraction magnetic element 39 and the moving magnetic element 43, the assumed magnitude of the attraction force being represented by the vector $F_a$.

It will be observed that, when the moving magnetic element 43 is in a position such as the position indicated in Fig. 2, magnetic forces also exist between the down-scale end or down-scale portion of the fixed magnetic element 35 including its lip or flange 39, and the moving magnetic element 43. Although the forces therebetween are forces of magnetic repulsion, the vector direction tends to oppose the movement of the moving magnetic element 43 in the up-scale direction, as indicated by the assumed direction and magnitude of the vector $F_o$. The resulting tangential force tending to rotate the moving magnetic element 43 in an up-scale direction, which is a vector summation, is represented by $F_t$.

By employing the short-circuited turn with the fixed magnetic element 35, it will be observed that the down-scale portion or down-scale end of the fixed magnetic element 35 has a magnetic flux which is out of phase with respect to the magnetic flux in the moving magnetic element 43. Furthermore, because of the counter-flux produced by the short-circuited turn or shielding effect, magnetic flux is diverted from or impeded through, the lower portion of the fixed magnetic element 35. Because of the phase difference and the reduction in the magnetic strength of the lower portion of the fixed magnetic element, the magnitude of $F_o$ which tends to oppose the up-scale movement of the moving magnetic element 43 is decreased. Consequently, the short-circuited turn tends to increase the tangential force $F_t$ when the moving magnetic element 43 is in an up-scale position.

By employing the secondary circuit or short-circuited turn the greatest shift of the flux from the fixed magnetic element 35 to the moving magnetic element 43 occurs when the moving magnetic element 43 is adjacent the zero and full scale positions. Since the moving magnetic element 43 is normally quite weak magnetically at and adjacent to, the down-scale position, the short-circuited turn causes the magnetic pole strength of the moving magnetic element 43 to be increased while decreasing the magnetic pole strength of the adjacent portion of the fixed magnetic element 35. Also, since the torque depends upon the product of the magnetic pole strength of the magnetic elements, the product and also the torque tend to increase at and adjacent to, the zero or down-scale position of the moving magnetic element 43.

In Figures 1 and 2 it will be observed that the calibrator 99 and the moving magnetic element 43 form a series magnetic path, so that with an increase in magnetic flux through the moving magnetic element 43 and with an increase in the magnetic pole strength of the moving magnetic element 43, the product of the magnetic pole strengths of the calibrator 99 and the moving magnetic element 43 tends to increase and produce an increased torque, when the moving magnetic element 43 is adjacent the full up-scale position, even though the magnetic pole strength of the calibrator or attraction magnetic element 99 may be reduced. If the calibrator 111 is also employed, the magnetic forces with respect thereto are similarly affected.

Figure 3:
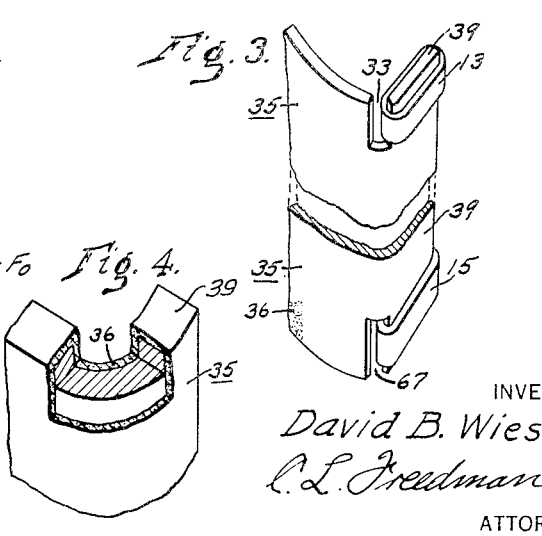
Fig. 3 is a fragmentary perspective view of a fixed magnetic element of an instrument, with another form of electromagnetic inductive circuit associated therewith.

Fig. 3 shows another means of associating one or more electromagnetic inductive circuits or short-circuited turns with the fixed magnetic element 35. A notch or slot 33 is cut in the top edge of the fixed magnetic element 35 where the lip or flange 39 joins the body portion or down-scale end of the fixed magnetic element 35. A band or ring 13 of electrical conducting material such as copper, is formed to slide over the end of the lip 39, one side of the ring 13 being positioned in the slot 33 which is of suitable size and shape to retain the ring 13 in the position shown. By similarly having a slot 67 in the lower edge of the fixed magnetic element 35 where its body portion joins the flange 39, a second ring 15 may be similarly positioned around the lower end of the flange 39. Although the rings or bands are shown surrounding the ends of the flange 39, the rings or bands could similarly be positioned around any other portion of the down-scale end of the fixed magnetic element 35, provided that the bands or rings are in a plane transverse to the magnetic flux.

Figure 4:
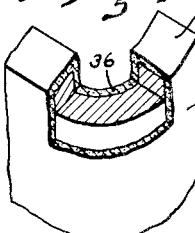
Fig. 4 is a fragmentary perspective vew of a fixed magnetic element, partly in cross-section, to show a current conducting surface or plating thereon.

The current conducting surface or plating 36, as applied to the soft-iron magnetic element 35 shown in Fig. 1, is illustrated in Fig. 4. Fig. 4 is an enlarged view, partly in cross-section, of the upper portion of the fixed magnetic element 35 from which the lip 39 projects. The plating 36 may be applied electrolytically to the fixed magnetic element 35, and is one form of short-circuited turn.

It is to be observed that as the frequency of the current applied to the winding 11 increases, the effect of the short-circuited turn increases. The short-circuited turn, however, has only a slight over-all effect upon the torque acting upon the moving magnetic element 43. It has been found in tests that at 300 and 900 cycles per second when the instruments calibrated at 60 cycles per second were employed as ammeters, the over-all frequency error of an iron-vane type of instrument having a fixed magnetic element 35 with its surfaces plated with a .0005" of nickel over .0005" of copper, was reduced 50%. By employing an instrument having the fixed magnetic element 35 with its surfaces plated with .001" of copper, the over-all frequency error was reduced over 60% under similar conditions.

By employing an instrument having a copper ring 13 around one down-scale end of the fixed magnetic element 35, such, for example, as shown in Fig. 3, it was found that the error from phase shift is eliminated over most of the scale. The ring may be a copper ring either plated or a formed piece. By employing a ring of copper which is .007" in thickness and ½" in width, around both zero ends of the fixed magnetic element 35, similar to the rings 13 and 15 in Fig. 3, the over-all error was found to have been decreased 80% under similar conditions.

It will be observed that the frequency compensating means herein disclosed and herein referred to as a short-circuited turn, may be one or more electromagnetic inductive closed circuits transverse to the magnetic field produced by the primary circuit or winding 11, surrounding at least a portion of the fixed magnetic element 35. In Fig. 3 the short-circuited turn is, for purposes of illustration, made up of a plurality of circuits, namely the rings 13 and 15.

By employing a high electrical conductive coating or plating 36 on the fixed magnetic element 35, the plating 36 serves as a protective coating, as well as serving beneficially to affect the operations of the instrument. A protective coating may also be applied to the moving magnetic element 43 but the protective coating should have a high electrical resistance to avoid diverting magnetic flux from the moving magnetic element 43. Since the iron parts should preferably be plated to prevent corrosion, the copper plating of the fixed magnetic element 35 of the instrument does not require added parts and does not, therefore, add to the cost of the instrument.

The shift in phase relationship between the moving magnetic element 43, when in down-scale positions, and the fixed magnetic element 35, because of the short-circuited turn, may tend to produce a small increase in frequency error over the first part of the scale but also tends to greatly decrease the frequency errors when the moving magnetic element 35 is in the up-scale positions, particularly at or near full up-scale position. Since the frequency error, when no short-circuited turn is employed, is small when the moving magnetic element 43 is adjacent the lower or down-scale end and increases rapidly when it is adjacent the full up-scale end, it will be observed that the over-all frequency error of the instrument is greatly decreased, even though a slight error may be introduced at the down-scale positions.

Although the invention has been described with reference to certain specific embodiments thereof, numerous modifications are possible. Therefore the appended claims have been drafted to cover not only the specific embodiments herein disclosed but also all other embodiments falling within the spirit and scope of the invention.

I claim as my invention:

1. In an electrical instrument of the iron-vane repulsion type, means effective when energized for producing a magnetic field which varies in accordance with a quantity to be measured, a fixed magnetic element disposed in said magnetic field, a moving magnetic element disposed in said magnetic field, which is movable in an up-scale direction when the instrument is energized, said magnetic elements being positioned to develop a repulsion force therebetween responsive to said magnetic field, means mounting said moving magnetic element for rotation relative to said fixed magnetic element, said fixed magnetic element comprising an arcuate portion tapered in the up-scale direction and extending adjacent the path of rotation of said moving magnetic element and configured to produce a torque acting on said moving magnetic element, at least one current conducting element surrounding at least a down-scale portion of the fixed magnetic element and positioned adjacent the path of rotation of said moving magnetic element for diverting flux from the fixed magnetic element to the adjacent moving magnetic element to minimize the over-all frequency error of the instrument.

2. In an electrical instrument, means effective when energized for producing a magnetic field which varies in accordance with a quantity to be measured, a fixed magnetic element disposed in said magnetic field, a moving magnetic element disposed in said magnetic field, which is movable in an up-scale direction when the instrument is energized, said magnetic elements being positioned to develop a force therebetween responsive to said magnetic field, means mounting said moving magnetic element for rotation relative to said fixed magnetic element, said fixed magnetic element comprising an arcuate portion tapered in the up-scale direction and extending adjacent the path of rotation of said moving magnetic element, said fixed magnetic element having a radial portion extending substantially radially relative to the axis of rotation of said moving magnetic element adjacent an extreme position of the moving magnetic element, an electrical conductor surrounding such radial portion, whereby the instrument is less affected by changes in frequency.

3. In an electrical measuring instrument of the moving-iron repulsion type having an arcuate fixed magnetic element with an axial length which decreases from the down-scale end, and having a moving magnetic element positioned substantially within the fixed magnetic element for movement adjacent a surface of the fixed magnetic element, a closed secondary conducting circuit associated with and linked by flux traversing at least the down-scale portion of such fixed magnetic element, said secondary conducting circuit being effective to minimize the over-all frequency error of the instrument.

4. A moving iron instrument having a repulsion magnetic element arcuate about an axis, a moving magnetic element mounted for rotation about said axis, and a flux-producing means for producing a magnetic field capable of directing magnetic flux in parallel through the elements to produce a repulsion force therebetween, said repulsion magnetic element being configured to produce a repulsion force between the elements for a predetermined value of said magnetic field, which decreases as said moving magnetic element moves from a position adjacent a first portion of the repulsion magnetic element towards a position adjacent a second portion of the repulsion magnetic element, in combination with an electro-conductive member surrounding flux traversing said first portion.

5. A moving iron instrument having a repulsion magnetic element arcuate about an axis, a moving magnetic element mounted for rotation about said axis, and field producing means for producing a magnetic field capable of directing magnetic flux in parallel through the elements to produce a repulsion force therebetween, said repulsion magnetic element being configured to produce a repulsion force between the elements for a predetermined value of said magnetic field, which decreases as said moving magnetic element moves from a position adjacent a first portion of the repulsion magnetic element towards a position adjacent a second portion of the repulsion magnetic element, in combination with an electro-conductive member substantially covering and in intimate contact with the repulsion magnetic element.

6. An iron-vane instrument having a solenoid which when energized is capable of producing magnetic flux which varies in accordance with the quantity to be measured, a fixed magnetic element and a moving magnetic element positioned within the solenoid to form parallel flux paths, the moving magnetic element being mounted for movement relative to the fixed magnetic element, the fixed magnetic element comprising an arcuate portion tapered in the up-scale direction, in combination with an electro-conductive member positioned within said solenoid and surrounding at least a portion of the fixed magnetic element, whereby the magnetic flux traversing such portions has a phase displacement with reference to the magnetic flux traversing the moving magnetic element.

DAVID B. WIESE.

REFERENCES CITED

The following references are of record in the file of this patent:

UNITED STATES PATENTS

| Number | Name | Date |
|---|---|---|
| 1,680,216 | Herzog | Aug. 7, 1928 |
| 1,776,708 | Clair | Sept. 23, 1930 |
| 1,805,447 | Esbaugh | May 12, 1931 |
| 2,183,566 | Hoare | Dec. 19, 1939 |
| 2,388,897 | Ammon | Nov. 13, 1945 |
| 2,427,571 | Pattee | Sept. 16, 1947 |
| 2,501,356 | Rights | Mar. 21, 1950 |